(12) United States Patent
Gift et al.

(10) Patent No.: US 11,639,250 B2
(45) Date of Patent: *May 2, 2023

(54) CLOSURE

(71) Applicant: Berry Global, Inc., Evansville, IN (US)

(72) Inventors: Steven Gift, Lititz, PA (US); John A. Vassallo, Lititz, PA (US); Thomas A. Genovese, Lititz, PA (US)

(73) Assignee: Berry Global, Inc., Evansville, IN (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/150,331

(22) Filed: Jan. 15, 2021

(65) Prior Publication Data

US 2021/0130046 A1 May 6, 2021

Related U.S. Application Data

(63) Continuation of application No. 16/377,841, filed on Apr. 8, 2019, now Pat. No. 10,961,024.

(60) Provisional application No. 62/654,590, filed on Apr. 9, 2018.

(51) Int. Cl.
| | |
|---|---|
| *B65D 41/04* | (2006.01) |
| *B65D 43/02* | (2006.01) |
| *B65D 51/16* | (2006.01) |
| *B29C 45/16* | (2006.01) |
| *B29C 37/00* | (2006.01) |
| *B29L 31/56* | (2006.01) |
| *B29K 21/00* | (2006.01) |
| *B29K 23/00* | (2006.01) |

(52) U.S. Cl.
CPC ...... *B65D 41/0485* (2013.01); *B29C 37/0085* (2013.01); *B29C 45/1676* (2013.01); *B65D 43/0231* (2013.01); *B65D 51/16* (2013.01); *B29K 2021/003* (2013.01); *B29K 2023/06* (2013.01); *B29K 2023/12* (2013.01); *B29L 2031/565* (2013.01); *B65D 2251/026* (2013.01); *B65D 2543/00296* (2013.01); *B65D 2543/00861* (2013.01)

(58) Field of Classification Search
CPC .......... B65D 41/0485; B65D 43/0231; B65D 51/16; B65D 2251/026; B65D 2543/00296

See application file for complete search history.

(56) References Cited

U.S. PATENT DOCUMENTS

| | | | |
|---|---|---|---|
| 5,868,273 | A | 2/1999 | Daenen |
| 6,142,325 | A | 11/2000 | Chomik |
| 8,109,396 | B1 | 2/2012 | Robinson |
| 2002/0113032 | A1 | 8/2002 | Blomdahl |
| 2005/0061766 | A1 | 3/2005 | Jochem |
| 2008/0302753 | A1 | 12/2008 | Jochem |

(Continued)

FOREIGN PATENT DOCUMENTS

| | | |
|---|---|---|
| WO | 0168468 A1 | 9/2001 |
| WO | 2008030400 A2 | 3/2008 |
| WO | 2015195516 A1 | 12/2015 |

OTHER PUBLICATIONS

European Search Report for European Patent App. No. 19784812.0 dated Dec. 14, 2021, BP-524 Ep II, 7 pages.

(Continued)

*Primary Examiner* — James N Smalley
(74) *Attorney, Agent, or Firm* — Barnes & Thornburg LLP

(57) ABSTRACT

A closure is configured to mount on a container to close an open mouth formed in the container. The closure includes a lid and an outer layer coupled to the lid.

20 Claims, 5 Drawing Sheets

(56) References Cited

U.S. PATENT DOCUMENTS

| | | |
|---|---|---|
| 2009/0084753 A1 | 4/2009 | Ramos |
| 2011/0068104 A1 | 3/2011 | Major |
| 2012/0039665 A1 | 2/2012 | Richardson |
| 2015/0016755 A1 | 1/2015 | Sheikh |
| 2015/0329250 A1 | 11/2015 | Barreto |

OTHER PUBLICATIONS

International PCT Search Report and Written Opinion for PCT App. No PCT/US2019/026302 dated Jun. 25, 2019, BP-524 PCT ||, 10 pages.

Office Action dated Jul. 21, 2020 for U.S. Appl. No. 16/377,841 (pp. 1-6).

Indian First Examination Report for Indian App. No. 202017048248 dated Mar. 28, 22, BP-524 IN ||, 6 pages.

CLOSURE

PRIORITY CLAIM

This application is a continuation of U.S. application Ser. No. 16/377,841, filed Apr. 8, 2019, which claims priority under 35 U.S.C. § 119(e) to U.S. Provisional Application No. 62/654,590, filed Apr. 9, 2018, each of which is expressly incorporated by reference herein.

BACKGROUND

The present disclosure relates to closures, and particularly to removable closures. More particularly, the present disclosure relates to closures made from plastics materials.

SUMMARY

According to the present disclosure, a canister includes a closure and a container. The container is formed to include a product-receiving chamber therein. The closure is configured to mount to the container to block selectively access to the product-receiving chamber through an open mouth formed in the container.

In illustrative embodiments, the closure includes a lid and a skin layer coupled to an outer surface of the lid. The lid is rigid and the skin layer is made of relatively soft materials to provide a comfortable grip interface for a user grasping the closure. For example, the lid may include polypropylene or polyethylene and the skin layer may include rubber. The skin layer is arranged to cover at least a portion of the lid and it may cover most of or the entire outer surface of the lid.

In illustrative embodiments, the closure is formed by overmolding the skin layer onto the lid. The lid is formed to include vent apertures that are configured to receive gases and/or excess skin layer materials during the overmolding process to minimize flashing of the skin layer.

In illustrative embodiments, the lid includes a top wall, a side wall coupled to a perimeter of the top wall and arranged to extend downwardly from the top wall, and a brim coupled to an end of the side wall. The top wall and the side wall define an outer surface of the lid. During manufacture, the skin layer is overmolded onto the outer surface of the lid such that at least a portion of the lid is covered by the skin layer.

In illustrative embodiments, the brim of the lid includes an outer surface and an inner surface. The brim is formed to include a vent aperture that extends into the brim from the outer surface toward the inner surface. In some embodiments, the vent aperture extends through the outer surface and the inner surface. In some embodiments, the vent aperture extends from the outer surface partway into the brim toward the inner surface.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a partial perspective view of a canister in accordance with the present disclosure showing that the canister includes a container and a closure coupled to the container, the container including a filler neck and a body formed to include a product receiving chamber, and showing that the closure is coupled to the container to block access to the product-receiving chamber;

FIG. 2 is a partial elevation view of the closure of FIG. 1 showing that the closure includes a lid and a skin layer coupled to the lid to provide a soft gripping interface for a user that is grasping the closure and further showing that the lid includes a top wall, a side wall arranged to extend downwardly from the top wall, and a brim couple to the side wall, the brim is formed to include a plurality of discrete vent apertures configured to receive gases and a portion of the skin layer during manufacture of the closure to minimize flashing of the skin layer;

Figure 6:
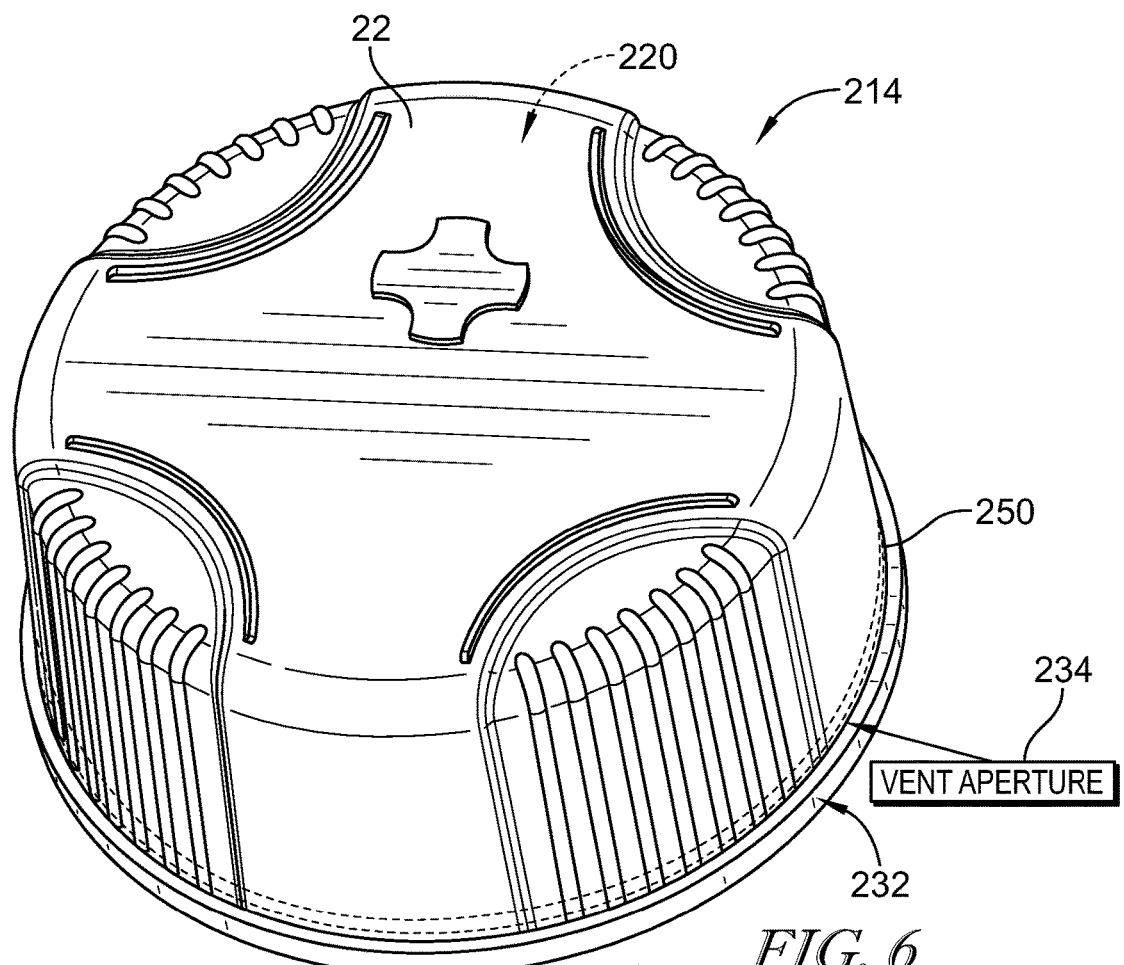
FIG. 6 is a perspective view of a second embodiment of a closure showing that the closure is formed to include an annular vent aperture that extends partway into a brim of the closure from an upper surface of the brim toward a lower surface of the brim without extending through the lower surface of the brim.
Figure 7:
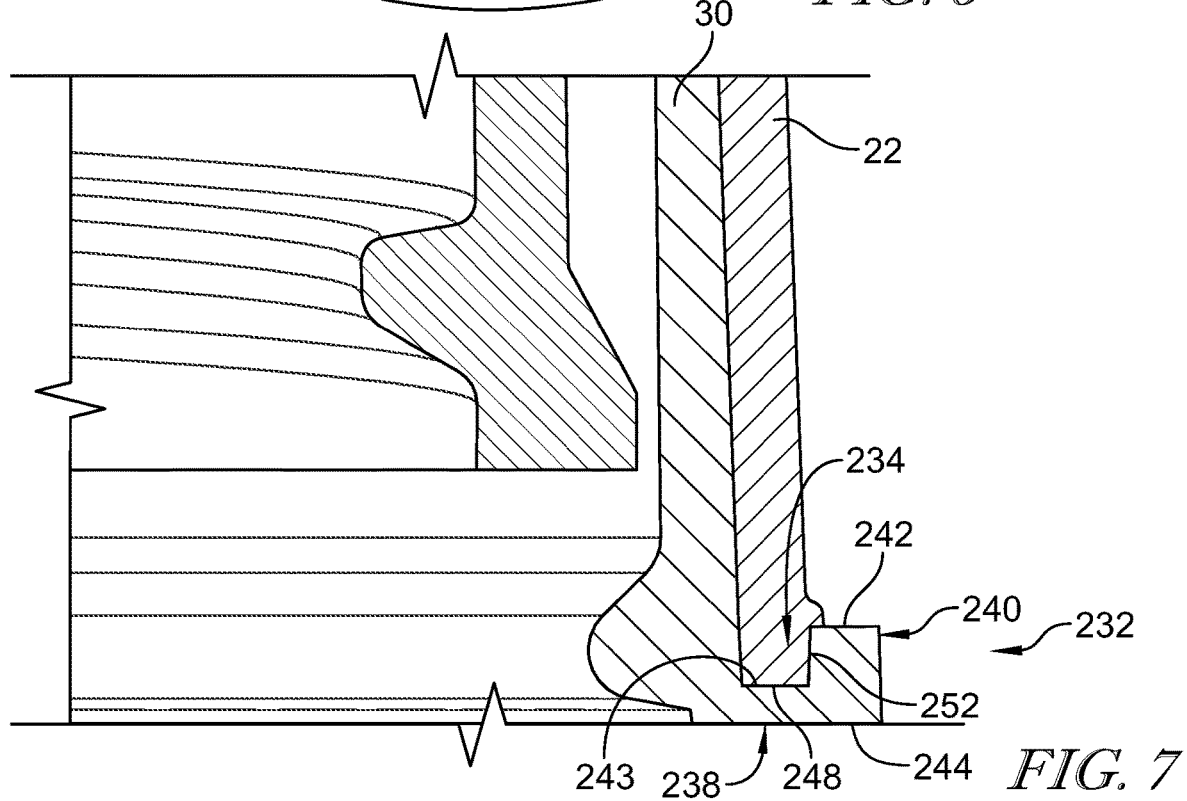
Figure 8:
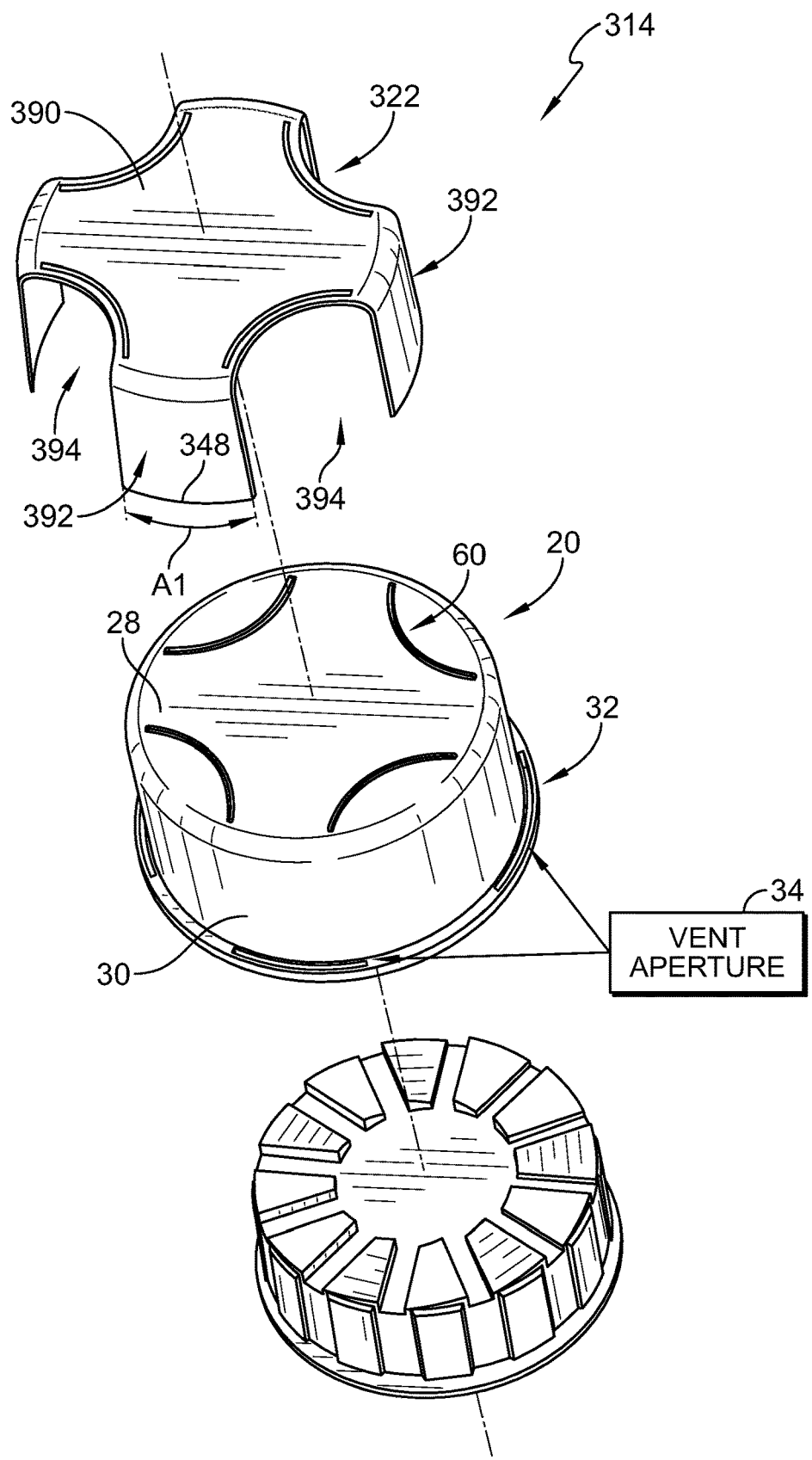

FIG. 7 is an enlarged section view of the second embodiment of the closure of FIG. 6 showing that the closure is formed to include the vent aperture that extends partway into the brim of the closure from the upper surface of the brim toward the lower surface; and FIG. 8 is an exploded assembly view of another embodiment of a closure showing that the closure includes, from top to bottom, a skin layer, a lid including a top wall, a side wall arranged to extend downwardly from the top wall, and a brim coupled to the side wall and showing that the skin layer includes a top wall and a plurality of legs spaced apart from one another and arranged to extend downwardly from the top wall into discrete vent apertures formed in the brim of the lid.

DETAILED DESCRIPTION

A first embodiment of a closure 14 in accordance with the present disclosure is shown in FIGS. 1-5. A second embodiment of a closure 214 is shown in FIGS. 6 and 7. A third embodiment of a closure 314 is shown in FIG. 8. Closures 14, 214, 314 are adapted to mate with a container 12 included in a canister 10 as suggested, for example, in FIG. 1.

Figure 1:
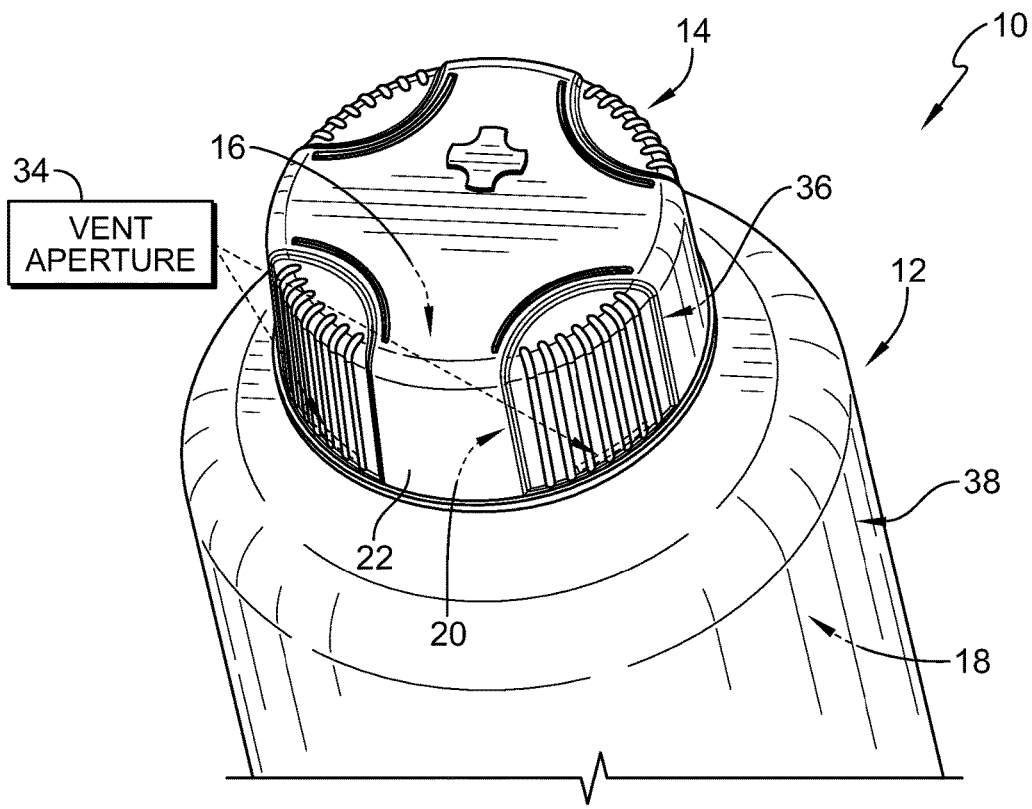
Figure 2:
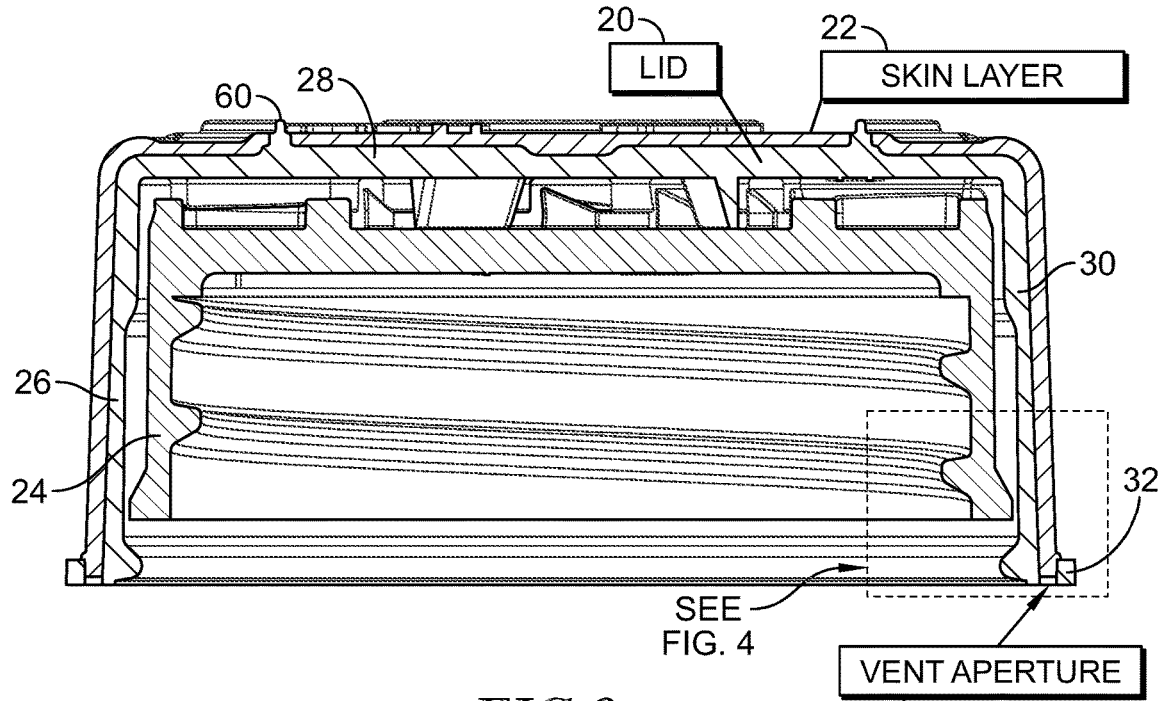
Figure 4:
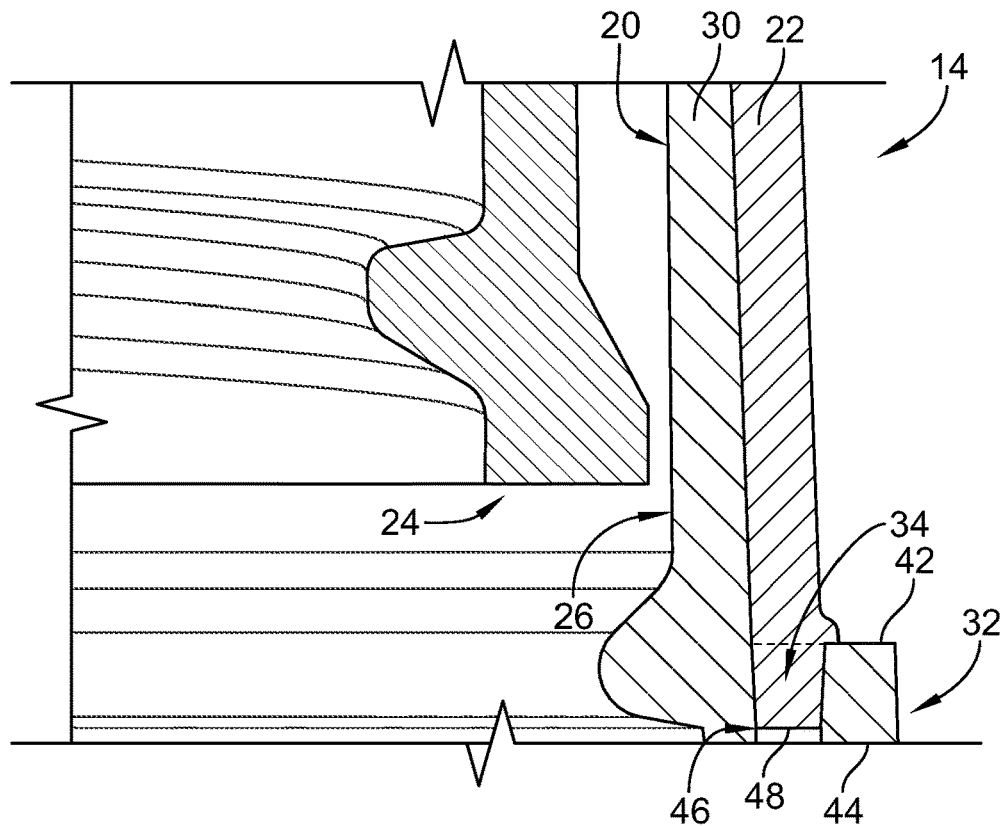
FIG. 4 is an enlarged view of FIG. 2 showing that the brim includes an upper surface arranged to face toward the top wall and a lower surface arranged to face downward away from the top wall and showing that the vent aperture extends from the upper surface to the lower surface and the skin layer extends into the vent aperture from the upper surface without extending beyond the lower surface.

Closure 14 includes a lid 20 and a skin layer 22 arranged to cover at least a portion of an outer surface 29 of lid 20 as shown in FIGS. 1 and 2. Skin layer 22 provides a soft grip interface for users grasping closure 14 to separate or mate closure 14 and container 12. Lid 20 is formed to include a plurality of discrete vent apertures 34 as shown in FIGS. 1, 2, and 4. In other embodiments, lid 20 includes a single continuous vent aperture 234 as shown in FIGS. 6 and 7.

Vent apertures 34 are configured to allow gases and portions of skin layer 22 to flow into vent apertures 34 during manufacture of closure 14 so that flashing of skin layer 22 during the manufacturing process is minimized. In illustrative embodiments, skin layer 22 is overmolded onto lid 20 and vent apertures 34 allow excess skin layer material to be received in vent apertures 34 instead of flashing about a brim 32 of lid 20 during the overmolding process.

Figure 3:
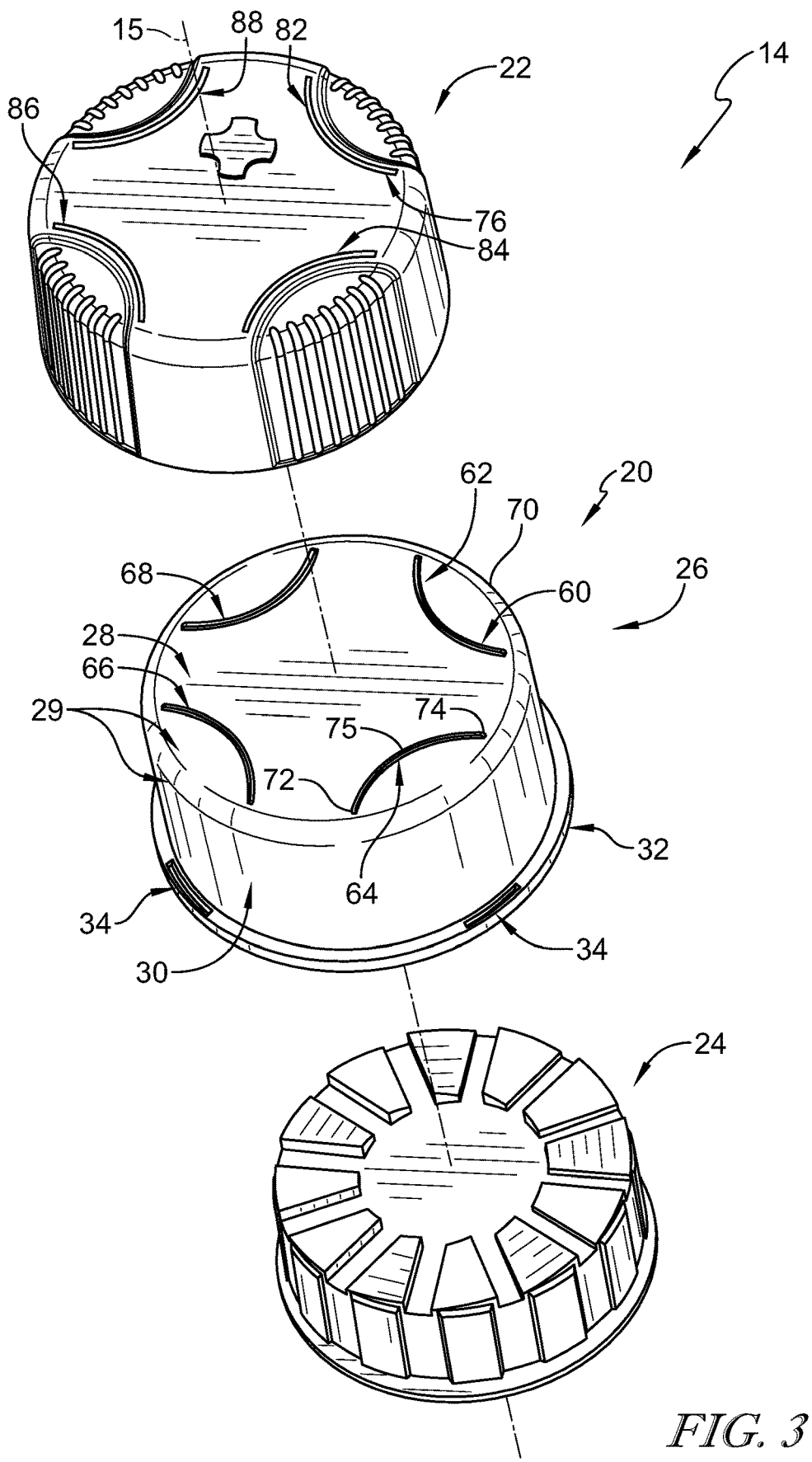
FIG. 3 is an exploded assembly view of the closure of FIG. 2 showing that the closure includes, from top to bottom, the skin layer, the lid having the vent apertures formed in the brim of the lid, and an inner cap that cooperates with the lid to mate with the container and block selectively the open mouth of the container.

Container 12 includes, for example, a filler neck 36 and a body 38, as shown in FIG. 1. Filler neck 36 cooperates with body 38 to define a product receiving chamber 18 therein. An open mouth 16 is formed in filler neck 36 and arranged to open into product receiving chamber 18 to allow communication with product receiving chamber 18 through open mouth 16. Closure 14 is configured to mount selectively on filler neck 36 of container 12 via complementary threads included in container 12 and closure 14 to cover open mouth 16 as suggested in FIG. 1. Container 12 and closure 14 share a common central axis 15 in a radially central location to container 12 and closure 14 as shown in FIG. 3.

Closure 14 includes lid 20 and skin layer 22 configured to provide a soft grip interface for a user grasping closure 14 as shown in FIG. 2. Lid 20 directly engages filler neck 36 of container 12 to cover open mouth 16 and block access to chamber 18. Skin layer 22 is overmolded onto lid 20 during manufacture of closure 14 such that at least a portion of lid 20 is covered by skin layer 22 and another portion of lid 20 is not covered by skin layer 22.

In the illustrative embodiment, lid 20 and skin layer 22 are formed from plastics materials. Lid 20 is made to be rigid. In illustrative embodiments, lid 20 includes polypropylene materials. In some embodiments, lid 20 includes polyethylene materials. Skin layer 22 is formed from materials that are different from the materials of lid 20. Skin layer 22 may include any suitable material such as, for example, thermoplastic elastomer materials, thermoplastic olefin materials, polypropylene, polyethylene, or any other suitable materials to provide a comfortable grip interface for a user.

Lid 20 includes a top wall 28, a side wall 30 coupled to top wall 28, and a brim 32 coupled to side wall 30 as shown in FIG. 2. Top wall 28 is arranged generally perpendicular to central axis 15 and cooperates with side wall 30 to define outer surface 29 of lid 20. Side wall 30 extends axially downward away from top wall 28 toward container 12. Brim 32 is coupled to a distal end of side wall 30 and is spaced apart from top wall 28. Brim 32 is formed to include a plurality of vent apertures 34 configured to receive the flow of gases and the portion of skin layer 22 during manufacture of closure 14 so that flashing of skin layer 22 is minimized. Vent apertures 34 extend downwardly into brim 32 toward container 12 and open upwardly toward top wall 28.

Brim 32 extends radially outward from side wall 30 and includes an upper surface 42 and a lower surface 44 as shown in FIG. 4. Upper surface 42 faces upwardly toward top wall 28. Lower surface 44 faces downwardly toward container 12. Illustratively, vent aperture 34 extends through upper surface 42 and lower surface 44 of brim 32 as shown in FIG. 4. Gases may flow from upper surface 42, through vent aperture 34, and past lower surface 44 as skin layer 22 is molded onto lid 20.

In the illustrative embodiment, skin layer 22 is configured to flow into vent aperture 34 such that an end 48 of skin layer 22 stops at a point 46 between upper surface 42 and lower surface 44 and between side wall 30 and brim 32. That is, skin layer 22 does not extend downwardly beyond lower surface 44 of brim 32. In other embodiments, end 48 of skin layer 22 may rest at any point before, between, or beyond upper surface 42 or lower surface 44 of brim 32.

Figure 5:
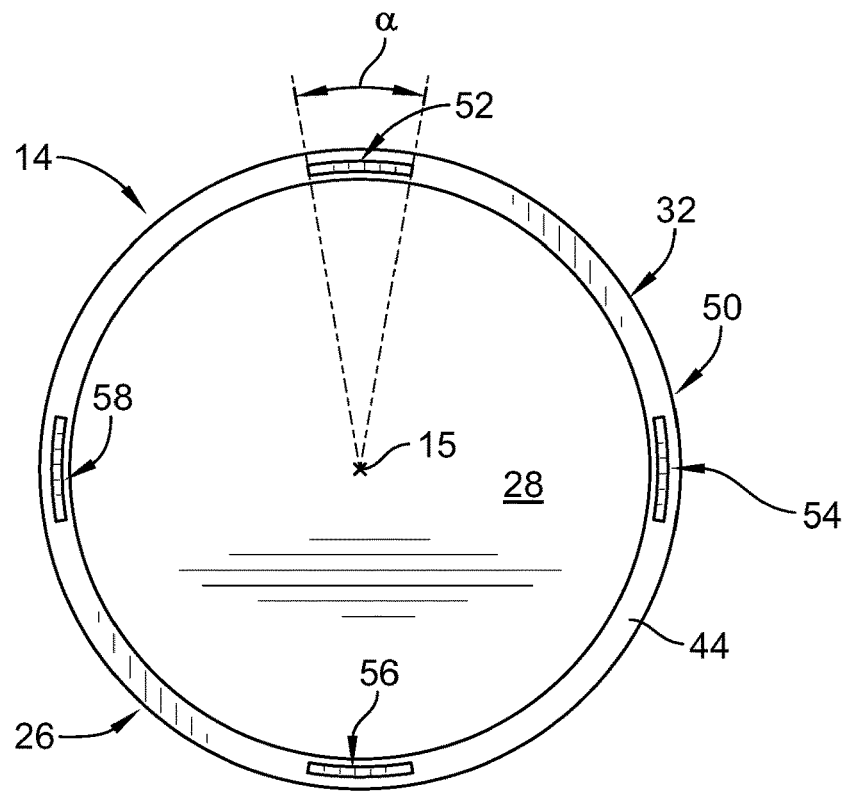
FIG. 5 is a bottom view of the closure of FIG. 2 showing the lower surface of the brim, the plurality of vent apertures formed in the brim, and that the skin layer extends into the vent apertures.

In the illustrative embodiment, brim 32 is formed to include a plurality of vent apertures 34 as shown by the bottom view of outer cap 26 of lid 20 in FIG. 5. The vent apertures 34 are spaced apart from one another circumferentially relative to a perimeter 50 of brim 32. Illustratively, brim 32 is formed to include first, second, third, and fourth vent apertures 52, 54, 56, 58 spaced apart from one another circumferentially around perimeter 50. Each vent aperture is spaced apart from a neighboring vent aperture 34 by an angle. The angle is about 90 degrees in the illustrative embodiment such that each vent aperture 34 is equally spaced from neighboring vent apertures 34. However, in other embodiments, the vent apertures may not be space equally from one another.

In the illustrative embodiment, each vent aperture 34 is discrete and configured to extend partway around perimeter 50 of brim 32 by an angle $\alpha$ as shown in FIG. 5. In the illustrative embodiment, the angle $\alpha$ is about 20 degrees. In some embodiments, the angle $\alpha$ is less than 360 degrees. In some embodiments, the angle $\alpha$ is less than about 180 degrees. In some embodiments, the angle $\alpha$ is less than about 90 degrees. In some embodiments, the angle $\alpha$ is less than about 45 degrees.

In some embodiments, the angle $\alpha$ is between about 5 and about 30 degrees. In some embodiments, the angle $\alpha$ is between about 10 and about 25 degrees. In some embodiments, the angle $\alpha$ is between about 15 and about 25 degrees.

Lid 20 further includes slide rails 60 coupled to top wall 28 and arranged to extend upwardly from top wall 28 away from container 12 as shown in FIGS. 2 and 3. Skin layer 22 is formed to include slide-rail apertures 76 sized and shaped to receive slide rails 60 when skin layer 22 is overmolded onto lid 20. Skin layer 22 is overmolded onto lid 20 such that slide rails 60 of lid 20 extend through skin layer 22. Slide rails 60 have a lower coefficient of friction than skin layer 22.

Slide rails 60 extend beyond skin layer 22 and allow closure 14 to slide on surfaces when closure 14 is upside-down and supported on the surfaces by slide rails 60. Skin layer 22 does not extend downwardly beyond lower surface 44 of brim 32 in the illustrative embodiments so that brim 32 supports closure 14 on surfaces when closure 14 is right-side up to allow closure 14 to slide on the surfaces.

In the illustrative embodiment, closure 14 includes a first, second, third, and fourth slide rail 62, 64, 66, 68 as shown in FIG. 3. Each of slide rails 62, 64, 66, 68 is spaced apart from neighboring slide rails 62, 64, 66, 68 about equal distances circumferentially around a perimeter 70 of top wall 28. However, in other embodiments, slide rails 62, 64, 66, 68 may not be spaces apart equally around perimeter 70. Skin layer 22 is formed to include complementary slide rail apertures 82, 84, 86, 88 that receive respective slide rails 62, 64, 66, 68.

Each of slide rails 62, 64, 66, 68 have a curvilinear shape and are convex relative to central axis 15 as shown in FIG. 3. Each slide rail 62, 64, 66, 68 has a first end 72 and a second end 74, both of which are arranged adjacent to perimeter 70 of top wall 28. Slide rails 62, 64, 66, 68 also have a midsection 75 that extends radially inward in an arc from ends 72, 74 toward central axis 15 to define the curvilinear shape of slide rails 62, 64, 66, 68. In other embodiments, slide rails 62, 64, 66, 68 extend radially outward from axis 15. The slide rails may have any other suitable shape in other embodiments.

Illustratively, lid 20 includes an inner cap 24 configured to engage filler neck 36 and an outer cap 26 arranged to overlay inner cap 24 as shown in FIG. 3. Outer cap 26 floats relative to inner cap 24 to provide a resistant lock for closure 14. Closure 14 may be removed from filler neck 36 by moving outer cap 26 toward inner cap 24 such that a plurality of teeth formed in outer cap 26 interlock with a plurality of teeth formed in inner cap 24 and twisting outer cap 26 and the inner cap via the interlocked teeth. However, in other embodiments, lid 20 may not include an inner cap and may directly engage filler neck 36 of container 12.

A method of providing or manufacturing closure 14 includes a number of steps. The method includes molding lid 20 to include top wall 28, side wall 30, and brim 32. The method includes forming vent aperture 34 in closure 14 that extends downwardly into brim 32 and opens upwardly toward top wall 28. The method includes molding skin layer 22 onto at least a portion of top wall 28 and side wall 30. The method includes locating a portion of skin layer 22 in vent aperture 34.

In some embodiments, the step of molding lid 20 and the step of forming vent aperture 34 are performed at the same time. Additionally, the step of molding skin layer 22 and the step of locating the portion of skin layer 22 in vent aperture 34 are performed at the same time.

In some embodiments, vent aperture 34 extends downwardly only partway into brim 32. In another embodiment, vent aperture 34 extends through brim 34. Illustratively, the step of locating a portion of skin layer 22 in vent aperture 34 includes locating the portion of skin layer 22 in vent aperture 34 such that skin layer 22 does not extend beyond a bottom 44 of brim 32.

Another embodiment of a closure 214, in accordance with the present disclosure, is shown in FIGS. 6 and 7. Closure 214 is similar to closure 14 of the present disclosure. As such, similar reference numbers are used in the disclosure of closure 214 to describe elements of closure 214 that are similar to elements described above relating to closure 14. Closure 214 includes a lid 220 and skin layer 22 arranged to cover lid 220.

Lid 220 includes top wall 28, side wall 30 coupled to top wall 28, and a brim 232 coupled to side wall 30 as shown in FIGS. 6 and 7. Brim 232 is coupled to a distal end of side wall 30 and is spaced apart from top wall 28. Brim 232 is formed to include a vent aperture 234 that is configured to receive a flow of gases and a portion of skin layer 22 during manufacture of closure 14 so that flashing of skin layer 22 is minimized.

Brim 232 includes an upper surface 242 and a lower surface 244 as shown in FIG. 7. Upper surface 242 faces upwardly toward top wall 28. Lower surface 244 faces downwardly toward container 12. Vent aperture 234 extends partway into upper surface 242 toward lower surface 244 as shown in FIG. 7.

Brim 232 includes an annular ring 238 and an annular lip 240 as shown in FIGS. 6 and 7. Annular ring 238 is coupled to the distal end of side wall 30 and extends radially outward from side wall 30 and central axis 15. Annular lip 240 is coupled to annular ring 238 and extends axially upward from annular ring 238 toward top wall 28. Annular lip 240 is spaced apart from side wall 30 to provide at least a portion of vent aperture 234 between annular lip 240 and side wall 30. Skin layer 22 extends toward an upper surface 243 of annular ring 238.

Illustratively, vent aperture 234 is embodied as a trough 234 that runs circumferentially around a perimeter 250 of brim 232. Upper surface 243 of annular ring 238, an inner surface 252 of annular lip 240, and a portion of side wall 30 define trough 234. Skin layer 22 may end on or axially above upper surface 243 of annular ring 238. In other embodiments, skin layer 22 may end at any point between upper surface 242 and top wall 28.

Another embodiment of a closure 314, in accordance with the present disclosure, is shown in FIG. 8. Closure 314 is similar to closure 14 of the present disclosure. As such, similar reference numbers are used in the disclosure of closure 314 to describe elements of closure 314 that are similar to elements described above relating to closure 14. Closure 314 includes lid 20 and a skin layer 322 arranged to cover lid 20.

Skin layer 322 includes an upper wall 390 and a plurality of side legs 392 coupled to upper wall 390 and that extend downwardly from upper wall 390 as shown in FIG. 8. Upper wall 390 is formed to include a plurality of slide rail spaces 394 that border slide rails 60 included in lid 20. Spaces 394 extend from upper wall 390 of skin layer 322 to brim 32 of lid 20 on each side of legs 392. In this way, undercuts provided by slide rails are avoided to facilitate overmolding skin layer 322 onto lid 20.

Vent apertures 34 formed in brim 32 of lid 20 are aligned with legs 392 of skin layer 322 as suggested in FIG. 8. As such, an end 348 of each leg 392 may extend downward from upper wall 390 and into vent apertures 34 during the overmolding process. Illustratively, legs 392 have an arc length A1 that is equal to an arc length of vent apertures 34. However, in other embodiments, arc length A1 may be larger or smaller than the arc length of vent apertures 34.

In illustrative embodiments, a two-piece child restraint closure 14 is described in FIGS. 1-8. An outer piece is configured to be grasped by a user to actuate outer piece toward an inner piece so that closure 14 may be removed from a container 12. Outer piece is overmolded with thermoplastic elastomer (TPE), or another suitable material, to improve grip and to add a comfortable, soft feel experienced by the user.

In illustrative embodiments, the overmolding process may include providing a first shot and a second shot of materials. The overmolding of the thermoplastic elastomer in production injection molds may be challenging as the material may need to fill the mold cavity without flashing. In some embodiments, steel components used in the mold may limit the amount of injection pressure needed to fill out the second shot.

In illustrative embodiments, instead of an end of the second shot terminating at a blind pocket between the steel mold and the first shot, vents 34 may be provided in a skirt of the first shot. These vents may allow at least a portion of the second shot to flow to a parting line (where the cavity of the mold and the core steel separate) and volatile gases may flow to the atmosphere. Allowing the second shot to vent to the atmosphere may reduce the pressure required to fill the second shot and may open up a larger overall process window. This may increase cycle times and improve efficiencies of overmolded components.

The invention claimed is:

1. A closure comprising
a rigid lid configured to close an open mouth of a container and
a skin layer coupled to the rigid lid to provide a soft grip interface for a user grasping the closure,
wherein the lid includes a top wall, a side wall coupled to the top wall and arranged to extend downwardly away from the top wall, and a brim coupled to the side wall and arranged to extend away from the side wall, wherein the skin layer is arranged around at least a portion of the top wall and the side wall of the rigid lid, and wherein the brim of the rigid lid is formed to include a vent aperture arranged to extend downwardly into the brim away from the top wall to allow gases and excess portions of the skin layer to move into the vent aperture during manufacture of the closure so that flashing of the skin layer is minimized, and wherein the vent aperture extends only partway through the brim.

2. The closure of claim 1, wherein the vent aperture extends about 20 degrees around the side wall of the lid.

3. The closure of claim 1, wherein the skin layer comprises thermoplastic elastomer materials.

4. The closure of claim 1, wherein the skin layer comprises thermoplastic olefin materials.

5. The closure of claim 1, wherein the lid comprises polypropylene.

6. The closure of claim 1, wherein the lid comprises polyethylene.

7. The closure of claim 1, wherein the top wall is formed to include a slide rail that extends upwardly away from the top wall and the slide rail extends through the skin layer.

8. The closure of claim 7, wherein the skin layer comprises at least one of thermoplastic elastomer materials and thermoplastic olefin materials.

9. The closure of claim 8, wherein the rigid lid comprises at least one of polypropylene and polyethylene.

10. The closure of claim 1, wherein the vent aperture is continuous and extends 360 degrees around the side wall of the lid.

11. A closure comprising a rigid lid configured to close an open mouth of a container and a skin layer coupled to the rigid lid to provide a soft grip interface for a user grasping the closure, wherein the lid includes a top wall, a side wall coupled to the top wall and arranged to extend downwardly away from the top wall, and a brim coupled to the side wall and arranged to extend away from the side wall, wherein the skin layer is arranged around at least a portion of the top wall and the side wall of the rigid lid, and wherein the brim of the rigid lid is formed to include a vent aperture arranged to extend downwardly into the brim away from the top wall to allow gases and excess portions of the skin layer to move into the vent aperture during manufacture of the closure so that flashing of the skin layer is minimized, and wherein the vent aperture is continuous and extends 360 degrees around the side wall of the lid.

12. The closure of claim 11, wherein the vent aperture extends only partway through the brim.

13. The closure of claim 11, wherein a portion of the vent aperture extends through an upper surface of the brim and a lower surface of the brim.

14. A closure comprising a rigid lid configured to close an open mouth of a container and a skin layer coupled to the rigid lid to provide a soft grip interface for a user grasping the closure, wherein the lid includes a top wall, a side wall coupled to the top wall and arranged to extend downwardly away from the top wall, and a brim coupled to the side wall and arranged to extend away from the side wall, wherein the skin layer is arranged around at least a portion of the top wall and the side wall of the rigid lid, and wherein the brim of the rigid lid is formed to include a vent aperture arranged to extend downwardly into the brim away from the top wall to allow gases and excess portions of the skin layer to move into the vent aperture during manufacture of the closure so that flashing of the skin layer is minimized, and wherein the top wall is formed to include a slide rail that extends upwardly away from the top wall.

15. The closure of claim 14, wherein the brim includes an upper surface and a lower surface that is spaced apart from the upper surface and the vent aperture extends into the upper surface toward the lower surface.

16. The closure of claim 15, wherein at least a portion of the skin layer extends into the vent aperture without extending beyond the lower surface.

17. The closure of claim 14, wherein the slide rail extends through the skin layer.

18. The closure of claim 17, wherein at least a portion of the vent aperture extends through an upper surface of the brim and a lower surface of the brim.

19. The closure of claim 17, wherein the vent aperture extends 20 degrees around the side wall of the lid.

20. The closure of claim 14, wherein the vent aperture is continuous and extends 360 degrees around the side wall of the lid.

* * * * *